(12) United States Patent
Wang et al.

(10) Patent No.: US 11,589,435 B2
(45) Date of Patent: Feb. 21, 2023

(54) METHOD AND SYSTEM FOR RAPIDLY AND QUANTITATIVELY ADJUSTING BEAM ANGLE OF ILLUMINATING DEVICE

(71) Applicant: ANDON HEALTH CO., LTD., Tianjin (CN)

(72) Inventors: Hao Wang, Tianjin (CN); Qin Li, Tianjin (CN); Jun Liu, Tianjin (CN); Yang Guo, Tianjin (CN); Fei Zhang, Tianjin (CN)

(73) Assignee: ANDON HEALTH CO., LTD., Tianjin (CN)

( * ) Notice: Subject to any disclaimer, the term of this patent is extended or adjusted under 35 U.S.C. 154(b) by 0 days.

(21) Appl. No.: 17/715,992

(22) Filed: Apr. 8, 2022

(65) Prior Publication Data
US 2022/0264713 A1  Aug. 18, 2022

(30) Foreign Application Priority Data

Feb. 9, 2021  (CN) .......................... 202110178749.5

(51) Int. Cl.
| | |
|---|---|
| H05B 45/14 | (2020.01) |
| H05B 47/155 | (2020.01) |
| H05B 47/14 | (2020.01) |
| H05B 45/355 | (2020.01) |

(52) U.S. Cl.
CPC ........... H05B 45/14 (2020.01); H05B 45/355 (2020.01); H05B 47/14 (2020.01); H05B 47/155 (2020.01)

(58) Field of Classification Search
None
See application file for complete search history.

(56) References Cited

U.S. PATENT DOCUMENTS

| | | | | |
|---|---|---|---|---|
| 2009/0267540 | A1* | 10/2009 | Chemel ................. | H05B 47/18 315/297 |
| 2010/0259200 | A1* | 10/2010 | Beausoleil ............ | H05B 45/10 315/320 |

FOREIGN PATENT DOCUMENTS

CN   205480449 U   8/2016

* cited by examiner

*Primary Examiner* — Dedei K Hammond
(74) *Attorney, Agent, or Firm* — Bayramoglu Law Offices LLC

(57) ABSTRACT

A method for rapidly and quantitatively adjusting a beam angle of an illuminating device includes: determining a target beam angle according to an actual scene, and sending, by using an input apparatus, the target beam angle to the illuminating device; receiving, by a receiver of the illuminating device, the target beam angle and sending the target beam angle to a controller of the illuminating device; determining, by the controller of the illuminating device, target power of each light source according to the target beam angle and a parameter table stored in a local read-only memory (ROM) or cloud of the illuminating device; and driving, by a driver, each light source to emit light according to the corresponding target power, enabling radiated light to be mixed in an illuminated space to change the beam angle, and obtaining the target beam angle according to a superposition principle for the intensity of light.

13 Claims, 3 Drawing Sheets

METHOD AND SYSTEM FOR RAPIDLY AND QUANTITATIVELY ADJUSTING BEAM ANGLE OF ILLUMINATING DEVICE

CROSS REFERENCE TO THE RELATED APPLICATIONS

This application is based upon and claims priority to Chinese Patent Application No. 202110178749.5, filed on Feb. 9, 2021, the entire contents of which are incorporated herein by reference.

TECHNICAL FIELD

The present disclosure belongs to the technical field of lighting, and particularly relates to a method and system for rapidly and quantitatively adjusting a beam angle of an illuminating device.

BACKGROUND

A beam angle is an important parameter of an illuminating device. According to the standard, the beam angle is generally defined as an included angle formed by two sides at a position where the luminous intensity reaches ½ of the luminous intensity of a normal. The beam angle reflected on an illuminated surface is the size of a light spot and the illuminance. For a same light source, the larger the beam angle is, the smaller the central luminous intensity is, the larger the light spot on the illuminated surface is, and the weaker the central illuminance of the illuminated surface is.

With the continuous improvement of user's pursuit of high-quality illuminating environments, there are more and more demands for light distribution of different beam angles. Small light spots with small beam angles are suitable for accent lighting; and large light spots with large beam angles are suitable for ambient illumination. A user also wants to continuously adjust the size of the beam angle to achieve desired illuminating effects as illuminating scenes are different.

There are three traditional methods for adjusting the beam angle: 1, the beam angle is adjusted by a rotary adjustment structure outside a lamp; 2, the beam angle is adjusted by an adjustment structure at the tail of the lamp; and 3, the beam angle is adjusted by a local part, namely a toggle adjustment structure of the lamp.

The above-mentioned structure may be realized manually or electrically. However, both manual and electric modes belong to a mechanical adjustment. A principle is to adjust the beam angle and the size of the light spot by changing a distance between the light source and a lens. The structural design of the mechanical adjustment is difficult. As a result, the lamp is larger in size. In addition, the mechanical adjustment has the disadvantages of poor consistency, low controllability, inaccurate and slow adjustment, easy wear, short life of a mechanical structure, noises during the adjustment and etc., thereby seriously affecting the user's experience during use.

Traditional equipment, that changes the beam angle by controlling multiple light sources to mix light, may only change the beam angle qualitatively, and may not adjust the beam angle rapidly, precisely and quantitatively, thereby seriously affecting the user's experience during use as well.

SUMMARY

To solve the problems existing in the prior art, one objective of the present disclosure is to provide a method for rapidly and quantitatively adjusting a beam angle of an illuminating device; and the other objective of the present disclosure is to provide a system for rapidly and quantitatively adjusting a beam angle of an illuminating device.

For this, a technical solution of the present disclosure is as follows:

A method for rapidly and quantitatively adjusting a beam angle of an illuminating device, where the illuminating device includes at least two light sources; each of the light sources is coupled to an optical element and includes a group of light-emitting diode (LED) luminous elements; each group of LED luminous elements are evenly distributed on an annular surface; the annular surfaces are concentric; and the method includes the following steps:

S1, determining a target beam angle according to an actual scene, and sending, by using an input apparatus, the target beam angle to the illuminating device;

S2, receiving, by a receiver of the illuminating device, the target beam angle and sending the target beam angle to a controller of the illuminating device;

S3, determining, by the controller of the illuminating device, target power of each light source according to the target beam angle and a parameter table stored in a local read-only memory (ROM) or cloud of the illuminating device; and S4, driving, by a driver, each light source to emit light according to the corresponding target power, enabling radiated light to be mixed in an illuminated space to change the beam angle, and obtaining the target beam angle according to a superposition principle for the intensity of light, where the parameter table is a table of relationships between the beam angle of the illuminating device and the corresponding power of the at least two light sources.

In one embodiment of the present disclosure, an illuminating device includes a first light source and a second light source, and a parameter table is obtained at rated power by the following way:

spatial luminous intensity distribution data of the first light source is represented as:

$$I_1(\theta) = I_{10}\cos^{m_1}\theta, \; -180° \leq \theta < 180°,$$

where:

$I_{10}$ is the luminous intensity in a direction perpendicular to a normal direction of a light source surface, and is related to input power of the first light source, $I_{10}=g(W_1)$; $\theta$ is a direction angle; and $m_1$ depends on a half beam angle $\theta_{1/2}^1$, $$m_1 = \frac{-\ln 2}{\ln(\cos\theta_{1/2}^1)};$$

spatial luminous intensity distribution data of the second light source is represented as:

$$I_2(\theta) = I_{20}\cos^{m_2}\theta, \; -180° \leq \theta < 180°, 2$$

where:

$I_{20}$ is the luminous intensity in the normal direction of the light source surface, and is related to input power of the second light source, $I_{20}=g(W_2)$; $\theta$ is the direction angle; and $m_2$ depends on a half beam angle $\theta_{1/2}^2$, $$m_2 = \frac{-\ln 2}{\ln(\cos\theta_{1/2}^2)};$$

if the beam angle to be reached is assumed to be A, and total power of a lamp is W, then:

$$W_1 + W_2 = W,$$

$$\frac{I_{10}\cos^{m_1}(A/2) + I_{20}\cos^{m_2}(A/2)}{I_{10} + I_{20}} = \frac{g(W_1)\cos^{m_1}(A/2) + g(W_2)\cos^{m_2}(A/2)}{g(W_1) + g(W_2)} = \frac{1}{2},$$

the input power $W_1$ of the first light source and the input power $W_2$ of the second light source are calculated; and according to the above-mentioned algorithm, the corresponding power and $W_1{}^i$ and $W_2{}^i$ of the first light source and the second light source is calculated for different beam angles $A_i$, and the parameter table is obtained.

In another embodiment of the present disclosure, an illuminating device includes a first light source and a second light source, and a parameter table is obtained at rated power based on a discrete point by the following way:

spatial luminous intensity distribution data of the first light source is represented as:

$$I_1(\theta) = I_{10}K_1(\theta),$$

$$\theta \in \{-180°, -179°, -178°, \ldots, 0°, \ldots, 177°, 178°, 179°\},$$

where:

$I_{10}$ is the luminous intensity in a normal direction of the light source surface, and is related to input power of the first light source, $I_{10}=g(W_1)$; $\theta$ is a direction angle; and $$K_1(\theta) = \frac{I_1(\theta)}{I_{10}},$$

$I_1(\theta)$ and $I_{10}$ are determined by a spatial distribution photometer at constant power;

spatial luminous intensity distribution data of the second light source at the rated power is represented as:

$$I_2(\theta) = I_{20}K_2(\theta),$$

$$\theta \in \{-180°, -179°, -178°, \ldots, 0°, \ldots, 177°, 178°, 179°\},$$

where:

$I_{20}$ is the luminous intensity in a direction perpendicular to the normal direction of the light source surface, and is related to input power of the second light source, $I_{20}=g(W_2)$; $\theta$ is the direction angle; and $$K_2(\theta) = \frac{I_2(\theta)}{I_{20}},$$

$I_2(\theta)$ and $I_{20}$ are determined by the spatial distribution photometer at constant power; and if the beam angle to be reached is assumed to be A, and total power of a lamp is W, then:

$$W_1 + W_2 = W,$$

$$\frac{I_{10}K_1(A/2) + I_{20}K_2(A/2)}{I_{10} + I_{20}} = \frac{g(W_1)K_1(A/2) + g(W_2)K_2(A/2)}{g(W_1) + g(W_2)} = \frac{1}{2};$$

the input power $W_1$ of the first light source and the input power $W_2$ of the second light source are calculated; and according to the above-mentioned algorithm, the corresponding power and $W_1{}^i$ and $W_2{}^i$ of the first light source and the second light source is calculated for different beam angles, and the parameter table is obtained.

In other one embodiment of the present disclosure, an illuminating device includes a first light source and a second light source, and under the condition that the central luminous intensity of a lamp is not changed, a parameter table is obtained by the following way:

spatial luminous intensity distribution data of the first light source at rated power may be represented as:

$$I_1(\theta) = I_{10}\cos^{m_1}\theta, \quad -180° \leq \theta < 180°,$$

where:

$I_{10}$ is the luminous intensity in a normal direction of the light source surface, and is related to input power of the first light source, $I_{10}=g(W_1)$; $\theta$ is a direction angle; and $m_1$ depends on a half beam angle $\theta_{1/2}{}^1$, $$m_1 = \frac{-\ln 2}{\ln(\cos\theta_{1/2}^1)};$$

spatial luminous intensity distribution data of the second light source at the rated power may be represented as:

$$I_2(\theta) = I_{20}\cos^{m_2}\theta, \quad -180° \leq \theta < 180°,$$

where:

$I_{20}$ is the luminous intensity in the normal direction of the light source surface, and is related to input power of the second light source, $I_{20}=g(W_2)$; $\theta$ is the direction angle; and $m_2$ depends on the half beam angle $\theta_{1/2}{}^2$, $$m_2 = \frac{-\ln 2}{\ln(\cos\theta_{1/2}^2)};$$

if the beam angle to be reached is assumed to be A, and the central luminous intensity is B, then:

$$I_{10} + I_{20} = g(W_1) + g(W_2) = B,$$

$$\frac{I_{10}\cos^{m_1}(A/2) + I_{20}\cos^{m_2}(A/2)}{I_{10} + I_{20}} =$$

$$\frac{g(W_1)\cos^{m_1}(A/2) + g(W_2)\cos^{m_2}(A/2)}{g(W_1) + g(W_2)} = \frac{1}{2},$$

the input power $W_1$ of the first light source and the input power $W_2$ of the second light source are calculated; and according to the above-mentioned algorithm, the corresponding power $W_1{}^i$ and $W_2{}^i$ of the first light source and the second light source is calculated for different beam angles $A_i$, and the parameter table is obtained.

In addition, the corresponding power $W_1^{ij}$ and $W_2^{ij}$ of the first light source and the second light source is calculated for the different beam angles $A_i$ and the central luminous intensity $B_j$, and the parameter table is obtained.

In one embodiment of the present disclosure, an illuminating device includes a first light source and a second light source, and under the condition that the central luminous intensity of a lamp is not changed, a parameter table is obtained based on a discrete point by the following way:

spatial luminous intensity distribution data of the first light source at rated power is represented as:

$$I_1(\theta) = I_{10}K_1(\theta), \theta \in \{-180°, -179°, -178°, ..., 0°, ..., 177°, 178°, 179°\},$$

where:

$I_{10}$ is the luminous intensity in a normal direction of the light source surface, and is related to input power of the first light source, $I_{10}=g(W_1)$; $\theta$ is a direction angle; and $$K_1(\theta) = \frac{I_1(\theta)}{I_{10}},$$

$I_1(\theta)$ and $I_{10}$ are determined by a spatial distribution photometer at constant power;

spatial luminous intensity distribution data of the second light source at the rated power is represented as:

$$I_2(\theta) = I_{20}K_2(\theta), \theta \in \{-180°, -179°, -178°, ..., 0°, ..., 177°, 178°, 179°\},$$

where:

$I_{20}$ is the luminous intensity perpendicular to the normal direction of the light source surface, and is related to the input power of the second light source, $I_{20}=g(W_2)$; $\theta$ is the direction angle; and $$K_2(\theta) = \frac{I_2(\theta)}{I_{20}},$$

$I_2(\theta)$ and $I_{20}$ are determined by the spatial distribution photometer at constant power; and if the beam angle to be reached is assumed to be A, and the central luminous intensity is B, then:

$$I_{10} + I_{20} = g(W_1) + g(W_2) = B,$$

$$\frac{I_{10}K_1(A/2) + I_{20}K_2(A/2)}{I_{10} + I_{20}} = \frac{g(W_1)K_1(A/2) + g(W_2)K_2(A/2)}{g(W_1) + g(W_2)} = \frac{1}{2},$$

the input power $W_1$ of the first light source and the input power $W_2$ of the second light source are calculated; and according to the above-mentioned algorithm, the corresponding power and $W_1^i$ and $W_2^i$ of the first light source and the second light source is calculated for different beam angles $A_i$, and the parameter table is obtained.

In addition, the corresponding power $W_1^{ij}$ and $W_2^{ij}$ of the first light source and the second light source is calculated for the different beam angles $A_i$ and the central luminous intensity $B_j$, and the parameter table is obtained.

Preferably, the illuminating device further comprises a distance sensor; and the controller automatically calculates the central luminous intensity B according to distance information obtained by the distance sensor and default illuminance E, and then looks up the parameter table according to the target beam angle to determine target power of the first light source and the second light source.

The present disclosure further provides a system for rapidly and quantitatively adjusting a beam angle of an illuminating device, where the illuminating device includes at least two light sources; each of the light sources is coupled to an optical element; the system includes:

a power supply, configured to supply power to a receiver, a controller, and a driver in the system;

an input apparatus, configured to send a target beam angle instruction to the illuminating device;

the receiver, configured to receive the target beam angle instruction from the input apparatus;

the controller, configured to receive the target beam angle instruction received by the receiver and determine the power of each light source by calculating or looking up a parameter table; and the driver, configured to drive the corresponding light source to emit light according to the power of each light source to obtain a target beam angle; and preferably, the illuminating device comprises a first light source and a second light source, each of the first light source and the second light source comprises a group of light-emitting diode (LED) luminous elements, the two groups of LED luminous elements each are evenly distributed on an annular surface, the two annular surfaces are concentric, and the optical elements are annular lenses coupled to the annular surfaces; or, the two groups of LED luminous elements are arranged on one annular surface, the LED luminous elements of the first light source and the second light source are alternately arranged, and each of the light sources is provided with a plurality of the optical elements respectively coupled to the positions where the LED luminous elements thereof are located.

Preferably, spatial luminous intensity distribution data of the first light source and the second light source is obtained by a spatial distribution photometer and configured to determine the parameter table and calculate first control power and second control power.

The present disclosure has the following beneficial effects:

The method for rapidly and quantitatively adjusting the beam angle of the illuminating device according to the present disclosure is capable of adjusting the beam angle in a precise, fast and highly consistent and controllable manner as it quantitatively calculates the beam angle by using a light mixing algorithm and utilizes electronic control; and compared with a product that mechanically adjusts the beam angle, no noises are generated during the adjustment, and the service life is long.

The system for rapidly and quantitatively adjusting the beam angle of the illuminating device according to the present disclosure is suitable for upgrading many types of illuminating devices currently on the market as it only needs to be added with a light source module and the specific light mixing algorithm, without any mechanical structure.

DETAILED DESCRIPTION OF THE EMBODIMENTS

A method and system for rapidly and quantitatively adjusting a beam angle of an illuminating device according to the present disclosure are described in detail below with reference to the accompanying drawings and embodiments.

Embodiment 1

Figure 6:
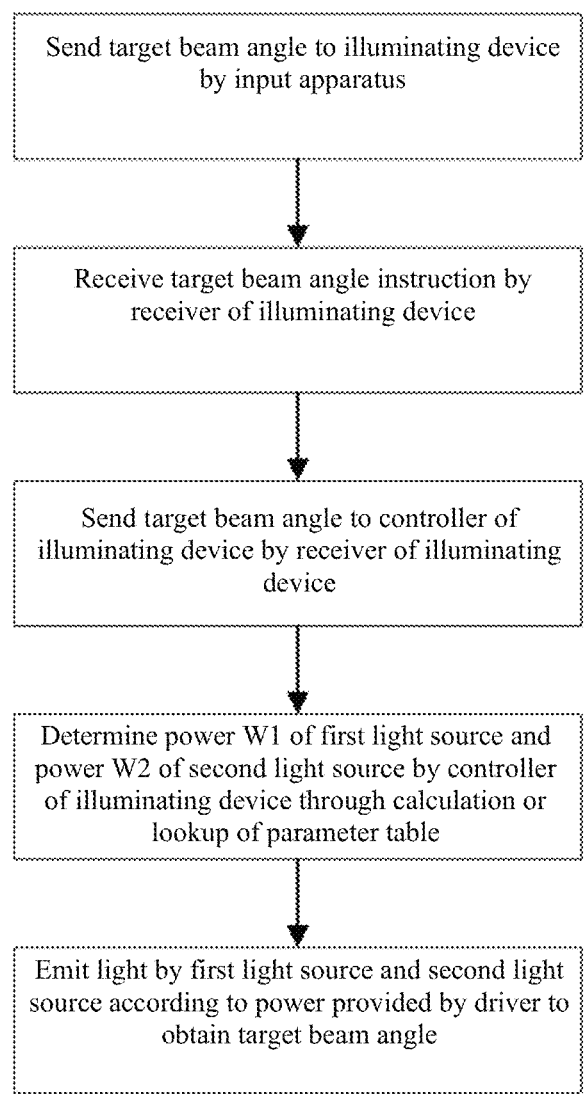
FIG. 6 is a flow chart of a method for rapidly and quantitatively adjusting a beam angle of an illuminating device according to the present disclosure.

Referring to FIG. 6, a method for rapidly and quantitatively adjusting a beam angle of an illuminating device according to the present disclosure includes the following steps:

S1, determine a target beam angle according to an actual scene, and send, by using an input apparatus, the target beam angle to the illuminating device;

S2, receive, by a receiver of the illuminating device, the target beam angle and sending the target beam angle to a controller of the illuminating device;

S3, determine, by the controller of the illuminating device, target power of each light source according to the target beam angle and a parameter table stored in a local ROM or cloud of the illuminating device; and S4, drive, by a driver, each light source to emit light according to the corresponding target power, enable radiated light to be mixed in an illuminated space to change the beam angle, and obtain the target beam angle according to a superposition principle for the intensity of light, where the parameter table is a table of relationships between the beam angle of the illuminating device and the corresponding power of the at least two light sources.

The calculation may be performed in a micro control unit (MCU) of the illuminating device or a cloud.

The embodiments 2-5 below are ways for obtaining the parameter table under different circumstances.

Embodiment 2

An illuminating device according to this embodiment includes a first light source and a second light source; each of the light sources includes two LED luminous elements; and a beam angle of the first light source is smaller than that of the second light source.

Under the condition that total power W (that is, rated power) of a lamp, a relationship between a target beam angle and target power of the first light source and a relationship between the target beam angle and target power of the second light source are shown in a parameter table below, where the parameter table is stored in a storage medium of the illuminating device:

| beam angle | target power |
|---|---|
| $A_1$ | $(W_1^1, W_2^1)$ |
| $A_2$ | $(W_1^2, W_2^2)$ |
| ... | ... |
| $A_k$ | $(W_1^k, W_2^k)$ |
| ... | ... |
| $A_i$ | $(W_1^i, W_2^i)$ | in the above table, $W_1^k \leq$ maximum input power of the first light source, and $W_2^k \leq$ maximum input power of the second light source, where k=1, 2, ... ,i; and, the beam angle of the first light source $\leq A_k \leq$ the beam angle of the second light source, where k=1,2, ... ,i.

The parameter table reflects the relationships between the beam angle A and control power $W_1$ and $W_2$ of the two light sources at certain total power of the lamp, that is, the beam angle of the illuminating device may be adjusted to a target angle by adjusting $W_1$ and $W_2$.

Parameter values in the parameter table are calculated by the following way:

In this embodiment, spatial luminous intensity distribution data of the first light source and the second light source, namely spatial luminous intensity distribution data of Lambertian light sources, is taken as an example for description.

The spatial luminous intensity distribution data of the first light source at rated power may be represented as:

$$I_1(\theta) = I_{10}\cos^{m_1}\theta, \quad -180° \leq \theta < 180°,$$

where:

$I_{10}$ is the luminous intensity in a direction perpendicular to a normal direction of a light source surface, and is related to input power of the first light source, $I_{10}g(W_1)$; $\theta$ is a direction angle; and $m_1$ depends on a half beam angle $\theta_{1/2}^1$, $$m_1 = \frac{-\ln 2}{\ln(\cos\theta_{1/2}^1)};$$

the spatial luminous intensity distribution data of the second light source at the rated power may be represented as:

$$I_2(\theta) = I_{20}\cos^{m_2}\theta, \quad -180° \leq \theta < 180°,$$

where:

$I_{20}$ is the luminous intensity in the normal direction of the light source surface, and is related to input power of the second light source, $I_{20}=g(W_2)$; $\theta$ is the direction angle; and $m_2$ depends on a half beam angle $\theta_{1/2}^2$, $$m_2 = \frac{-\ln 2}{\ln(\cos\theta_{1/2}^2)};$$

and if the beam angle to be reached is assumed to be A, and total power of a lamp is W, then:

$$W_1 + W_2 = W,$$

$$\frac{I_{10}\cos^{m_1}(A/2) + I_{20}\cos^{m_2}(A/2)}{I_{10} + I_{20}} = \frac{g(W_1)\cos^{m_1}(A/2) + g(W_2)\cos^{m_2}(A/2)}{g(W_1) + g(W_2)} = \frac{1}{2},$$

the input power $W_1$ of the first light source and the input power $W_2$ of the second light source are calculated.

Under the condition that the total power of the lamp is determined, all the data of the parameter table, for different beam angles $A_i$, may be provided by the above way.

Under the condition that the total power of the lamp is determined, the above way, for the different beam angles $A_i$, may serve as an algorithm for calculating $W_1$ and $W_2$ in a controller.

For more general scenes (when the spatial luminous intensity distribution data may not be expressed with an analysis formula), a calculation way based on a discrete point is as follows:

the spatial luminous intensity distribution data of the first light source at rated power may be represented as:

$$I_1(\theta) = I_{10}K_1(\theta), \theta \in \{-180°, -179°, -178°, ..., 0°, ..., 177°, 178°, 179°\},$$

where:

$I_{10}$ is the luminous intensity in a normal direction of the light source surface, and is related to input power of the first light source, $I_{10}=g(W_1)$; $\theta$ is a direction angle; and $$K_1(\theta) = \frac{I_1(\theta)}{I_{10}},$$

$I_1(\theta)$ and $I_{10}$ are determined by a spatial distribution photometer at constant power;

the spatial luminous intensity distribution data of the second light source at the rated power may be represented as:

$$I_2(\theta) = I_{20}K_2(\theta), \theta \in \{-180°, -179°, -178°, ..., 0°, ..., 177°, 178°, 179°\},$$

where:

$I_{20}$ is the luminous intensity perpendicular to the normal direction of the light source surface, and is related to input power of the second light source, $I_{20}=g(W_2)$; $\theta$ is the direction angle; and $$K_2(\theta) = \frac{I_2(\theta)}{I_{20}},$$

$I_2(\theta)$ and $I_{20}$ are determined by the spatial distribution photometer at constant power; and if the beam angle to be reached is assumed to be A, and total power of a lamp is W, then:

$$W_1 + W_2 = W,$$

$$\frac{I_{10}K_1(A/2) + I_{20}K_2(A/2)}{I_{10} + I_{20}} = \frac{g(W_1)K_1(A/2) + g(W_2)K_2(A/2)}{g(W_1) + g(W_2)} = \frac{1}{2},$$

the input power $W_1$ of the first light source and the input power $W_2$ of the second light source are calculated.

Under the condition that the total power of the lamp is determined, all the data of the parameter table, for different beam angles $A_i$, may be provided by the above way.

Under the condition that the total power of the lamp is determined, the above way, for the different beam angles $A_i$, may serve as an algorithm for calculating $W_1$ and $W_2$ in a controller. The total power W of the lamp is determined by adjusting the brightness of the lamp.

Embodiment 3

This embodiment describes a way for obtaining a parameter table, without changing the illuminance (central luminous intensity) of a lamp.

An illuminating device according to this embodiment includes a first light source and a second light source, and each of the light sources includes two LED luminous elements. For each illuminating device, the parameter table thereof may be represented as:

| beam angle | central luminous intensity B |
|---|---|
| $A_1$ | $(W_1^1, W_2^1)$ |
| $A_2$ | $(W_1^2, W_2^2)$ |
| ... | ... |
| $A_k$ | $(W_1^k, W_2^k)$ |
| ... | ... |
| $A_i$ | $(W_1^i, W_2^i)$ | in the above table, $W_1^k \leq$ maximum input power of the first light source, and $W_2^k \leq$ maximum input power of the second light source, where k=1,2, ...,i; and, the beam angle of the first light source $\leq A_k \leq$ the beam angle of the second light source, where k=1,2, ...,i.

The parameter table reflects the relationships between the beam angle A and control power $W_1$ and $W_2$ of the two light sources at certain central luminous intensity B, that is, the beam angle of the illuminating device may be adjusted to a target angle by adjusting $W_1$ and $W_2$.

Parameter values in the parameter table are calculated by the following way:

In this embodiment, spatial luminous intensity distribution data of the first light source and the second light source, namely spatial luminous intensity distribution data of Lambertian light sources, is taken as an example for description.

The spatial luminous intensity distribution data of the first light source at rated power may be represented as:

$$I_1(\theta) = I_{10}\cos^{m_1}\theta, -180° \leq \theta < 180°,$$

where:

$I_{10}$ is the luminous intensity in a normal direction of the light source surface, and is related to input power of the first light source, $I_{10}=g(W_1)$; $\theta$ is a direction angle; and $m_1$ depends on a half beam angle $\theta_{1/2}^1$, $$m_1 = \frac{-\ln 2}{\ln(\cos \theta_{1/2}^1)};$$

the spatial luminous intensity distribution data of the second light source at the rated power may be represented as:

$$I_2(\theta) = I_{20}\cos^{m_2}\theta, -180° \leq \theta < 180°,$$

where:

$I_{20}$ is the luminous intensity in the normal direction of the light source surface, and is related to input power of the second light source, $I_{20}=g(W_2)$; $\theta$ is the direction angle; and $m_2$ depends on a half beam angle $\theta_{1/2}^2$, $$m_2 = \frac{-\ln 2}{\ln(\cos\theta_{1/2}^2)};$$

and if the beam angle to be reached is assumed to be A, and the central luminous intensity is B, then:

$$I_{10} + I_{20} = g(W_1) + g(W_2) = B,$$

$$\frac{I_{10}\cos^{m_1}(A/2) + I_{20}\cos^{m_2}(A/2)}{I_{10}+I_{20}} = \frac{g(W_1)\cos^{m_1}(A/2) + g(W_2)\cos^{m_2}(A/2)}{g(W_1)+g(W_2)} = \frac{1}{2},$$

the input power $W_1$ of the first light source and the input power $W_2$ of the second light source are calculated.

Under the condition that the central luminous intensity B is not changed, all the data of the parameter table, for different beam angles $A_i$, may be provided by the above way.

Under the condition that the central luminous intensity B is not changed, the above way, for the different beam angles $A_i$, may serve as an algorithm for calculating $W_1$ and $W_2$ in a controller.

For more general scenes (when the spatial luminous intensity distribution data may not be expressed with an analysis formula), a calculation way based on a discrete point is as follows:

the spatial luminous intensity distribution data of the first light source at rated power may be represented as:

$$I_1(\theta) = I_{10}K_1(\theta), \theta \in \{-180°, -179°, -178°, ..., 0°, ..., 177°, 178°, 179°\},$$

where:

$I_{10}$ is the luminous intensity in a normal direction of the light source surface, and is related to input power of the first light source, $I_{10}=g(W_1)$; and $\theta$ is a direction angle;

the spatial luminous intensity distribution data of the second light source at the rated power may be represented as:

$$I_2(\theta) = I_{20}K_2(\theta), \theta \in \{-180°, -179°, -178°, ..., 0°, ..., 177°, 178°, 179°\},$$

where:

$I_{20}$ is the luminous intensity in a direction perpendicular to the normal direction of the light source surface, and is related to input power of the second light source, $I_{20}=g(W_2)$; and $\theta$ is the direction angle; and if the beam angle to be reached is assumed to be A, and the central luminous intensity is B, then:

$$I_{10} + I_{20} = g(W_1) + g(W_2) = B,$$

$$\frac{I_{10}K_1(A/2) + I_{20}K_2(A/2)}{I_{10}+I_{20}} = \frac{g(W_1)K_1(A/2) + g(W_2)K_2(A/2)}{g(W_1)+g(W_2)} = \frac{1}{2},$$

the input power $W_1$ of the first light source and the input power $W_2$ of the second light source are calculated.

Under the condition that the central luminous intensity B is not changed, all the data of the parameter table, for different beam angles $A_i$, may be provided by the above way.

Under the condition that the central luminous intensity B is not changed, the above way, for the different beam angles $A_i$, may serve as an algorithm for calculating $W_1$ and $W_2$ in a controller.

The central luminous intensity B may be determined by the manually input illuminance E. If a surface, under the lamp, with a distance of d=1 m from the lamp is taken as a referential receiving surface to achieve the illuminance of E=500 lux, then: $B=Ed^2=500*1^2=500$ cd.

Preferably, a system automatically calculates the central luminous intensity B according to distance information obtained by a distance sensor and default illuminance, and determines target power of the first light source and the second light source according to the stored parameter table. For example, according to relevant illuminating standards, the illuminance suitable for reading and writing is 500 lux. According to the distance information d obtained by the distance sensor, the central luminous intensity B is calculated, and then the parameter table is looked up according to the target beam angle to determine the target power of the first light source and the second light source.

Embodiment 4

This embodiment describes a way for obtaining a parameter table at different illuminance E/central luminous intensity B of a lamp.

An illuminating device according to this embodiment consists of a first light source and a second light source, and each of the light sources consists of two LED luminous elements. For each illuminating device, the parameter table thereof may be represented as:

| beam angle | central luminous intensity | | | |
|---|---|---|---|---|
|  | $B_1$ | $B_2$ | ... | $B_j$ |
| $A_1$ | $(W_1^{11}, W_2^{11})$ | $(W_1^{12}, W_2^{12})$ | ... | $(W_1^{1j}, W_2^{1j})$ |
| $A_2$ | $(W_1^{21}, W_2^{21})$ | $(W_1^{22}, W_2^{22})$ | ... | $(W_1^{2j}, W_2^{2j})$ |
| ... | ... | ... | ... | ... |
| $A_k$ | $(W_1^{k1}, W_2^{k1})$ | $(W_1^{k2}, W_2^{k2})$ | ... | $(W_1^{kj}, W_2^{kj})$ |
| ... | ... | ... | ... | ... |
| $A_i$ | $(W_1^{i1}, W_2^{i1})$ | $(W_1^{i2}, W_2^{i2})$ | ... | $(W_1^{ij}, W_2^{ij})$ |

The parameter table reflects the relationships between the beam angle of the illuminating device and control power $W_1$ and $W_2$ of the first light source and the second light source and the relationships between the input central luminous intensity B of the illuminating device and the control power $W_1$ and $W_2$ of the first light source and the second light source. That is, when inputting a beam angle and central luminous intensity to the illuminating device, we will get the control power $W_1$ of the first light source and the control power $W_2$ of the second light source.

In the above table, A is the beam angle; B is the input central luminous intensity; and W is input power of the light source, there is:

$$\frac{W_1^{kl}}{W_2^{kl}} = \frac{W_1^{kl}}{W_2^{kl}},$$

where k=1,2, . . . ,i, l=1,2, . . . ,j;

$W_1^{kl} \leq$ maximum input power of the first light source, and $W_2^{kl} \leq$ maximum input power of the second light source, where k=1, 2, . . . ,i, l=1, 2, . . . ,j; and the beam angle of the first light source$\leq A_k \leq$the beam angle of the second light source, where k=1, 2, . . . ,i.

Preferably, a system automatically calculates the central luminous intensity B according to distance information obtained by a distance sensor and default illuminance E, and determines target power of the first light source and the second light source according to the stored parameter table. For example, according to relevant illuminating standards, the illuminance E suitable for reading and writing is 500 lux. According to the distance information d obtained by the distance sensor, the central luminous intensity B is calculated, and then the parameter table is looked up according to a target beam angle to determine the target power of the first light source and the second light source.

In this embodiment, spatial luminous intensity distribution data of the first light source and the second light source, namely spatial luminous intensity distribution data of Lambertian light sources, is taken as an example for description.

The spatial luminous intensity distribution data of the first light source at rated power may be represented as:

$$I_1(\theta) = I_{10}\cos^{m_1}\theta, \quad -180° \leq \theta < 180°,$$

where:

$I_{10}$ is the luminous intensity in a normal direction of the light source surface, and is related to the input power of the first light source, $I_{10}=g(W_1)$; $\theta$ is a direction angle; and $m_1$ depends on a half beam angle $\theta_{1/2}^1$, $$m_1 = \frac{-\ln 2}{\ln(\cos\theta_{1/2}^1)};$$

the spatial luminous intensity distribution data of the second light source at the rated power may be represented as:

$$I_2(\theta) = I_{20}\cos^{m_2}\theta, \quad -180° \leq \theta < 180°,$$

where:

$I_{20}$ is the luminous intensity in the normal direction of the light source surface, and is related to the input power of the second light source, $I_{20}=g(W_2)$; $\theta$ is the direction angle; and $m_2$ depends on a half beam angle $\theta_{1/2}^2$, $$m_2 = \frac{-\ln 2}{\ln(\cos\theta_{1/2}^2)};$$

and if the beam angle to be reached is assumed to be A, and the central luminous intensity is B, then:

$$I_{10} + I_{20} = g(W_1) + g(W_2) = B,$$

$$\frac{I_{10}\cos^{m_1}(A/2) + I_{20}\cos^{m_2}(A/2)}{I_{10} + I_{20}} = \frac{g(W_1)\cos^{m_1}(A/2) + g(W_2)\cos^{m_2}(A/2)}{g(W_1) + g(W_2)} = \frac{1}{2},$$

the input power $W_1$ of the first light source and the input power $W_2$ of the second light source are calculated.

For different beam angles $A_i$ and the central luminous intensity $B_j$, all the data of the parameter table may be provided by the above way.

For the different beam angles $A_i$ and the central luminous intensity $B_j$, the above way may serve as an algorithm for calculating $W_1$ and $W_2$ in a controller.

For more general scenes (when the spatial luminous intensity distribution data may not be expressed with an analysis formula), a calculation way based on a discrete point is as follows:

the spatial luminous intensity distribution data of the first light source at rated power may be represented as:

$$I_1(\theta) = I_{10}K_1(\theta),$$

$$\theta \in \{-180°, -179°, -178°, \ldots, 0°, \ldots, 177°, 178°, 179°\},$$

where:

$I_{10}$ is the luminous intensity in a normal direction of the light source surface, and is related to the input power of the first light source, $I_{10}=g(W_1)$; $\theta$ is the direction angle; and $$K_1(\theta) = \frac{I_1(\theta)}{I_{10}},$$

$I_1(\theta)$ and $I_{10}$ are determined by a spatial distribution photometer at constant power;

the spatial luminous intensity distribution data of the second light source at the rated power may be represented as:

$$I_2(\theta) = I_{20}K_2(\theta), \theta \in \{-180°, -179°, -178°, \ldots, 0°, \ldots, 177°, 178°, 179°\},$$

where:

$I_{20}$ is the luminous intensity in the normal direction of the light source surface, and is related to the input power of the second light source, $I_{20}=g(W_2)$; $\theta$ is the direction angle; and $$K_2(\theta) = \frac{I_2(\theta)}{I_{20}},$$

$I_2(\theta)$ and $I_{20}$ are determined by the spatial distribution photometer at constant power; and if the beam angle to be reached is assumed to be A, and the central luminous intensity is B, then:

$$I_{10} + I_{20} = g(W_1) + g(W_2) = B,$$

$$\frac{I_{10}K_1(A/2) + I_{20}K_2(A/2)}{I_{10} + I_{20}} = \frac{g(W_1)K_1(A/2) + g(W_2)K_2(A/2)}{g(W_1) + g(W_2)} = \frac{1}{2},$$

the input power $W_1$ of the first light source and the input power $W_2$ of the second light source are calculated.

For different beam angles $A_i$ and the central luminous intensity $B_j$, all the data of the parameter table may be provided by the above way.

For the different beam angles $A_i$ and the central luminous intensity $B_j$, the above way may serve as an algorithm for calculating $W_1$ and $W_2$ in a controller.

Figure 1:
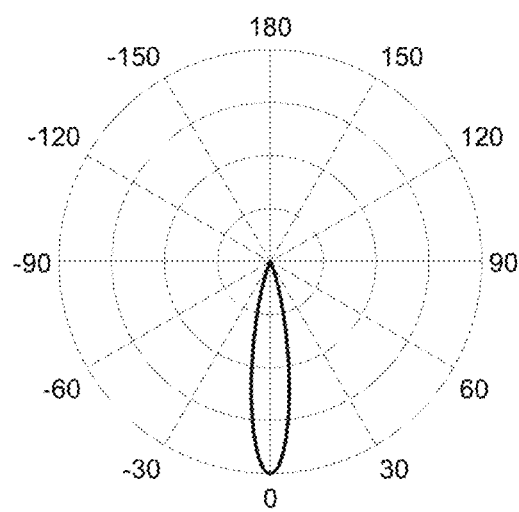
FIG. 1 is a schematic diagram of a spatial luminous intensity distribution curve of a first light source in an embodiment of the present disclosure.
Figure 2:
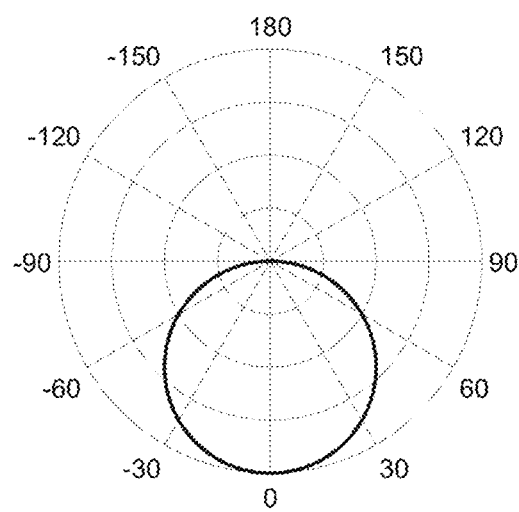
FIG. 2 is a schematic diagram of a spatial luminous intensity distribution curve of a second light source in an embodiment of the present disclosure.
Figure 3:
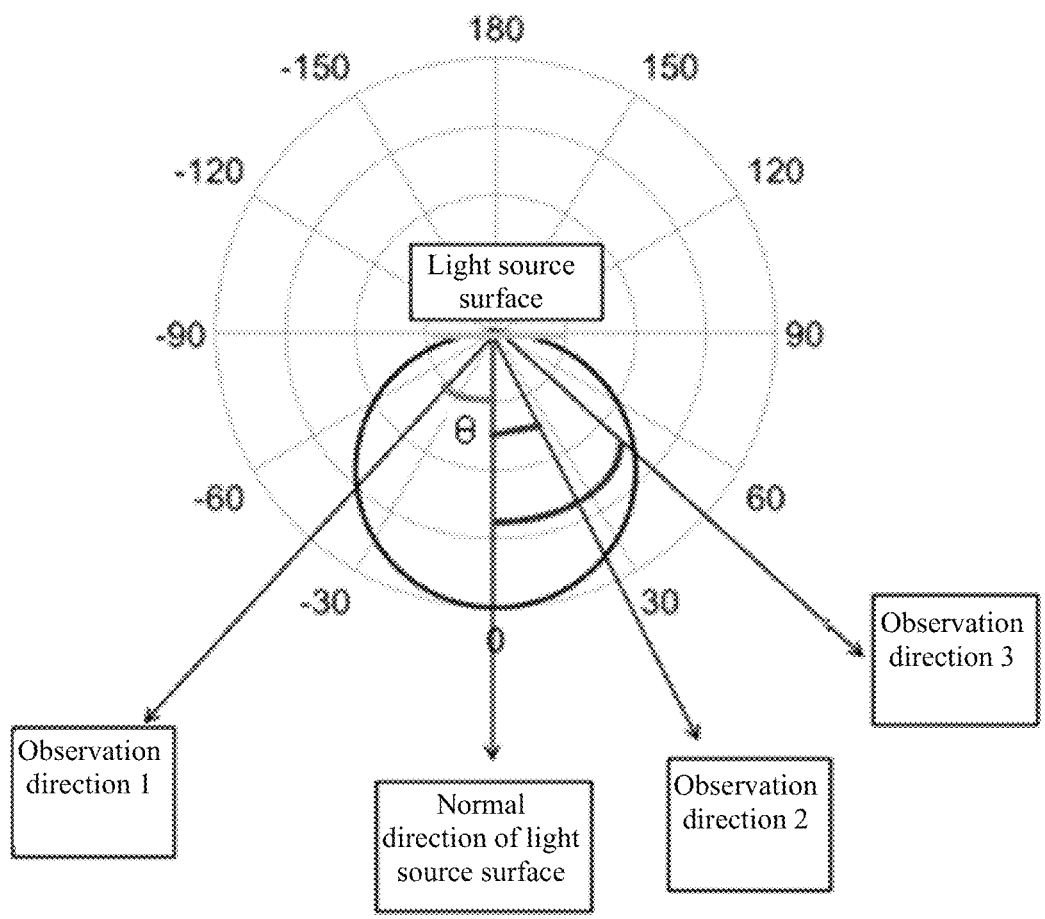
FIG. 3 is a schematic diagram of a relationship between a direction angle and a light source surface in the present disclosure.
Figure 4:
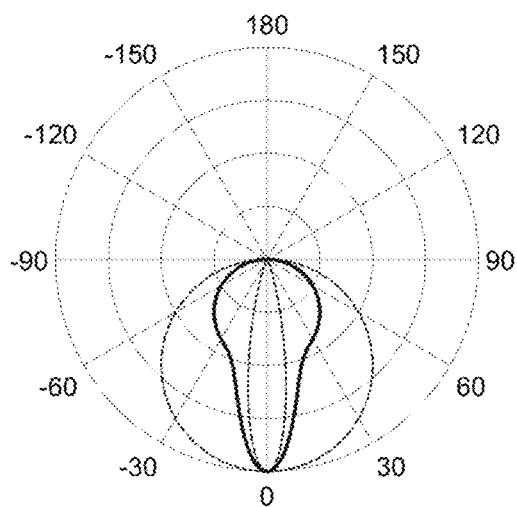
FIG. 4 is a schematic diagram of an intermediate beam angle obtained by mixing beam angles of two different light sources in FIG. 1 and FIG. 2.

FIG. 2 illustrates a spatial luminous intensity distribution curve of the first light source in an embodiment of the present disclosure, and the beam angle of the first light source is smaller; and FIG. 3 illustrates a spatial luminous intensity distribution curve of the second light source in an embodiment of the present disclosure, and the beam angle of the second light source is larger. FIG. 4 illustrates a light mixing effect of the spatial luminous intensity distribution curve of the first light source and the spatial luminous intensity distribution curve of the second light source. It can be seen, from the figure, that through the combination of different input power of the first light source and the second light source, any beam angle between the beam angle of the first light source and the beam angle of the second light source may be obtained.

Embodiment 5

For multiple light sources, according to the ways for two light sources in the previous three embodiments, under the condition that total power of a lamp and the illuminance (central luminous intensity) of the lamp are both not changed or the total power of the lamp is not changed and the illuminance (central luminous intensity) of the lamp is changed, the beam angle may be changed, input power of the multiple light sources is determined through an equation relationship of the previous three embodiments, and a parameter table is obtained.

Embodiment 6

Figure 5:
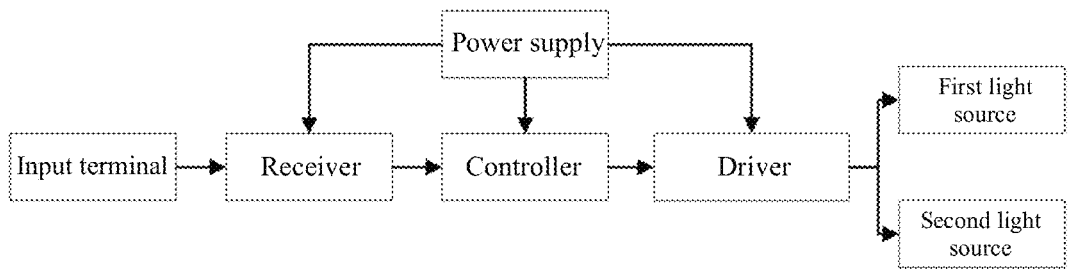
FIG. 5 is a constitutional diagram of a system for rapidly and quantitatively adjusting a beam angle of an illuminating device according to the present disclosure.

To implement the method, the present disclosure further provides a system for rapidly and quantitatively adjusting a beam angle of an illuminating device. As shown in FIG. 5, the system includes a power supply, an input apparatus, a receiver, a controller and a driver. Preferably, the illuminating device includes two light sources.

The power supply is configured to supply power to the receiver, the controller and the driver in the system.

The input apparatus is configured to send a target beam angle to the receiver of the illuminating device or send the target beam angle and target illuminance together to the receiver of the illuminating device.

The receiver is configured to receive the target beam angle and send it to the controller.

The controller is configured to receive the target beam angle and determine the power of each light source by calculating or looking up a parameter table.

The driver is configured to drive the corresponding light source to emit light according to the power of each light source to obtain the target beam angle.

The receiver, the controller and the driver are all installed in the illuminating device.

The input apparatus is a mobile application (APP), a Pad or a remote control.

The receiver is bluetooth equipment or wifi equipment.

The controller is a central processing unit (CPU) of the illuminating device.

The driver is a driver of a smart lamp.

Preferably, the illuminating device includes a first light source and a second light source, each of the first light source and the second light source includes a group of LED luminous elements, the two groups of LED luminous elements each are evenly distributed on an annular surface, the two annular surfaces are concentric, and the optical elements are annular lenses coupled to the annular surfaces.

Or, the two groups of LED luminous elements are arranged on one annular surface, the LED luminous elements of the first light source and the second light source are alternately arranged, and each of the light sources is provided with a plurality of the optical elements respectively coupled to the positions where the LED luminous elements thereof are located.

Preferably, spatial luminous intensity distribution data of the first light source and the second light source is obtained by a spatial distribution photometer and configured to determine the parameter table and calculate first control power and second control power.

The process of adjusting the beam angle of the illuminating device by the system is described below by taking the illuminating device having the two light sources as an example.

Referring to FIG. 5, the input apparatus is configured to send the target beam angle to the illuminating device, the receiver of the illuminating device is configured to receive a target beam angle instruction and send the target beam angle instruction to the controller of the illuminating device, the controller of the illuminating device is configured to determine the power W1 of the first light source and the power W2 of the second light source by the calculation way in the embodiment 2, the embodiment 3 or the embodiment 4 or by looking up the parameter table, the first light source and the second light source emit light according to the power provided by the driver, radiated light is mixed in an illuminated space to change the beam angle, and the target beam angle is obtained according to a superposition principle for the intensity of light.

The input apparatus and the receiver of the illuminating device may communicate through a wired or wireless technology.

What is claimed is:

1. A method for rapidly and quantitatively adjusting a beam angle of an illuminating device, wherein the illuminating device comprises at least two light sources, the method comprising the following steps:
    S1, determining a target beam angle according to an actual scene, and sending, by using an input apparatus, the target beam angle to the illuminating device;
    S2, receiving, by a receiver of the illuminating device, the target beam angle and sending the target beam angle to a controller of the illuminating device;
    S3, determining, by the controller of the illuminating device, target power of each light source of the at least two light sources according to the target beam angle and a parameter table stored in a local read-only memory (ROM) or cloud of the illuminating device; and
    S4, driving, by a driver, each light source to emit light according to the corresponding target power, enabling radiated light to be mixed in an illuminated space to change the beam angle, and obtaining the target beam angle according to a superposition principle for an intensity of light, wherein the parameter table is a table of relationships between the beam angle of the illuminating device and the corresponding power of the at least two light sources.

2. The method according to claim 1, wherein the illuminating device comprises a first light source and a second light source, and the parameter table is obtained at rated power by the following way:

spatial luminous intensity distribution data of the first light source is represented as:

$$I_1(\theta) = I_{10}\cos^{m_1}\theta, \ -180° \leq \theta < 180°,$$

wherein:

$I_{10}$ is a luminous intensity in a direction perpendicular to a normal direction of a light source surface, and $I_{10}$ is related to input power of the first light source, $I_{10}=g(W_1)$; $\theta$ is a direction angle; and $m_1$ depends on a first half beam angle $\theta_{1/2}^1$, $$m_1 = \frac{-\ln 2}{\ln(\cos\theta_{1/2}^1)};$$

spatial luminous intensity distribution data of the second light source is represented as:

$$I_2(\theta) = I_{20}\cos^{m_2}\theta, \ -180° \leq \theta < 180°,$$

wherein:

$I_{20}$ is a luminous intensity in the normal direction of the light source surface, and $I_{20}$ is related to input power of the second light source, $I_{20}=g(W_2)$; $\theta$ is the direction angle; and $m_2$ depends on a second half beam angle $\theta_{1/2}^2$, $$m_2 = \frac{-\ln 2}{\ln(\cos\theta_{1/2}^2)};$$

if the beam angle to be reached is assumed to be A, and total power of a lamp is W, then:

$$W_1 + W_2 = W,$$

$$\frac{I_{10}\cos^{m_1}(A/2) + I_{20}\cos^{m_2}(A/2)}{I_{10} + I_{20}} = $$

$$\frac{g(W_1)\cos^{m_1}(A/2) + g(W_2)\cos^{m_2}(A/2)}{g(W_1) + g(W_2)} = \frac{1}{2},$$

the input power $W_1$ of the first light source and the input power $W_2$ of the second light source are calculated; and according to the above-mentioned algorithm, the corresponding power $W_1^i$ of the first light source and the corresponding power $W_2^i$ of the second light source are calculated for different beam angles $A_i$, and the parameter table is obtained.

3. The method according to claim 1, wherein the illuminating device comprises a first light source and a second light source, and the parameter table is obtained at rated power based on a discrete point by the following way:

spatial luminous intensity distribution data of the first light source is represented as:

$$I_1(\theta) = I_{10}K_1(\theta),$$

$$\theta \in \{-180°, -179°, -178°, \ldots, 0°, \ldots, 177°, 178°, 179°\},$$

wherein:

$I_{10}$ is a luminous intensity in a normal direction of the light source surface, and $I_{10}$ is related to input power of the first light source, $I_{10}=g(W_1)$; $\theta$ is a direction angle; and $$K_1(\theta) = \frac{I_1(\theta)}{I_{10}},$$

$I_1(\theta)$ and $I_{10}$ are determined by a spatial distribution photometer at constant power;

spatial luminous intensity distribution data of the second light source at the rated power is represented as:

$$I_2(\theta) = I_{20}K_2(\theta), \ \theta \in \{-180°, -179°, -178°, \ldots, 0°, \ldots, 177°, 178°, 179°\},$$

wherein:

$I_{20}$ is a luminous intensity in a direction perpendicular to the normal direction of the light source surface, and $I_{20}$ is related to input power of the second light source, $I_{20}=g(W_2)$; $\theta$ is the direction angle; and $$K_2(\theta) = \frac{I_2(\theta)}{I_{20}},$$

$I_2(\theta)$ and $I_{20}$ are determined by the spatial distribution photometer at the constant power;

if the beam angle to be reached is assumed to be A, and total power of the lamp is W, then:

$$W_1 + W_2 = W,$$

$$\frac{I_{10}K_1(A/2) + I_{20}K_2(A/2)}{I_{10} + I_{20}} = \frac{g(W_1)K_1(A/2) + g(W_2)K_2(A/2)}{g(W_1) + g(W_2)} = \frac{1}{2},$$

the input power $W_1$ of the first light source and the input power $W_2$ of the second light source are calculated; and according to the above-mentioned algorithm, the corresponding power $W_1^i$ of the first light source and the corresponding power $W_2^i$ of the second light source are calculated for different beam angles $A_i$, and the parameter table is obtained.

4. The method according to claim 1, wherein the illuminating device comprises a first light source and a second light source, and under a condition that a central luminous intensity of a lamp is not changed, the parameter table is obtained by the following way:

spatial luminous intensity distribution data of the first light source at rated power is represented as:

$$I_1(\theta) = I_{10}\cos^{m_1}\theta, \ -180° \leq \theta < 180°,$$

wherein:

$I_{10}$ is a luminous intensity in a normal direction of a light source surface, and $I_{10}$ is related to input power of the first light source, $I_{10}=g(W_1)$; θ is a direction angle; and $m_1$ depends on a first half beam angle $\theta_{1/2}^1$, $$m_1 = \frac{-\ln 2}{\ln(\cos(\theta_{1/2}^1))};$$

spatial luminous intensity distribution data of the second light source at the rated power is represented as:

$$I_2(\theta) = I_{20}\cos^{m_2}\theta, -180° \leq \theta < 180°,$$

wherein:

$I_{20}$ is a luminous intensity in the normal direction of the light source surface, and $I_{20}$ is related to input power of the second light source, $I_{20}=g(W_2)$; θ is the direction angle; and $m_2$ depends on a second half beam angle $\theta_{1/2}^2$, $$m_2 = \frac{-\ln 2}{\ln(\cos(\theta_{1/2}^2))};$$

if the beam angle to be reached is assumed to be A, and the central luminous intensity is B, then:

$$I_{10} + I_{20} = g(W_1) + g(W_2) = B,$$

$$\frac{I_{10}\cos^{m_1}(A/2) + I_{20}\cos^{m_2}(A/2)}{I_{10} + I_{20}} =$$

$$\frac{g(W_1)\cos^{m_1}(A/2) + g(W_2)\cos^{m_2}(A/2)}{g(W_1) + g(W_2)} = \frac{1}{2},$$

the input power $W_1$ of the first light source and the input power $W_2$ of the second light source are calculated; and according to the above-mentioned algorithm, the corresponding power $W_1^i$ of the first light source and the corresponding power $W_2^i$ of the second light source are calculated for different beam angles $A_i$, and the parameter table is obtained.

5. The method according to claim 4, wherein the corresponding power $W_1^{ij}$ of the first light source and the corresponding power $W_2^{ij}$ of the second light source are calculated for the different beam angles $A_i$ and the central luminous intensity $B_j$, and the parameter table is obtained.

6. The method according to claim 5, wherein the illuminating device further comprises a distance sensor; and the controller automatically calculates the central luminous intensity B according to distance information obtained by the distance sensor and default illuminance E, and then looks up the parameter table according to the target beam angle to determine target power of the first light source and the second light source.

7. The method according to claim 4, wherein the illuminating device further comprises a distance sensor; and the controller automatically calculates the central luminous intensity B according to distance information obtained by the distance sensor and default illuminance E, and then looks up the parameter table according to the target beam angle to determine target power of the first light source and the second light source.

8. The method according to claim 1, wherein the illuminating device comprises a first light source and a second light source, and under a condition that a central luminous intensity of a lamp is not changed, the parameter table is obtained based on a discrete point by the following way:

spatial luminous intensity distribution data of the first light source at rated power is represented as:

$$I_1(\theta) = I_{10}K_1(\theta), \theta \in \{-180°, -179°, -178°, ..., 0°, ..., 177°, 178°, 179°\},$$

wherein:

$I_{10}$ is a luminous intensity in a normal direction of the light source surface, and $I_{10}$ is related to input power of the first light source, $I_{10}=g(W_1)$; θ is a direction angle; and $$K_1(\theta) = \frac{I_1(\theta)}{I_{10}},$$

$I_1(\theta)$ and $I_{10}$ are determined by a spatial distribution photometer at constant power;

spatial luminous intensity distribution data of the second light source at the rated power is represented as:

$$I_2(\theta) = I_{20}K_2(\theta), \theta \in \{-180°, -179°, -178°, ..., 0°, ..., 177°, 178°, 179°\},$$

wherein:

$I_{20}$ is a luminous intensity in a direction perpendicular to the normal direction of the light source surface, and $I_{20}$ is related to input power of the second light source, $I_{20}=g(W_2)$; θ is the direction angle; and $$K_2(\theta) = \frac{I_2(\theta)}{I_{20}},$$

$I_2(\theta)$ and $I_{20}$ are determined by the spatial distribution photometer at the constant power;

if the beam angle to be reached is assumed to be A, and the central luminous intensity is B, then:

$$I_{10} + I_{20} = g(W_1) + g(W_2) = B,$$

$$\frac{I_{10}K_1(A/2) + I_{20}K_2(A/2)}{I_{10} + I_{20}} = \frac{g(W_1)K_1(A/2) + g(W_2)K_2(A/2)}{g(W_1) + g(W_2)} = \frac{1}{2},$$

the input power $W_1$ of the first light source and the input power $W_2$ of the second light source are calculated; and according to the above-mentioned algorithm, the corresponding power $W_1^i$ of the first light source and the corresponding power $W_2^i$ of the second light source are calculated for different beam angles $A_i$, and the parameter table is obtained.

9. The method according to claim 8, wherein the corresponding power $W_1^{ij}$ of the first light source and the corresponding power $W_2^{ij}$ of the second light source are calculated for the different beam angles $A_i$ and the central luminous intensity $B_j$, and the parameter table is obtained.

10. The method according to claim 9, wherein the illuminating device further comprises a distance sensor; and the controller automatically calculates the central luminous intensity B according to distance information obtained by the distance sensor and default illuminance E, and then looks up the parameter table according to the target beam angle to determine target power of the first light source and the second light source.

11. The method according to claim 8, wherein the illuminating device further comprises a distance sensor; and the controller automatically calculates the central luminous intensity B according to distance information obtained by the distance sensor and default illuminance E, and then looks up the parameter table according to the target beam angle to determine target power of the first light source and the second light source.

12. A system for rapidly and quantitatively adjusting a beam angle of an illuminating device, wherein the illuminating device comprises at least two light sources; each light source of the at least two light sources is coupled to an optical element; the system comprises:
   a power supply, configured to supply power to a receiver, a controller, and a driver in the system;
   an input apparatus, configured to send a target beam angle instruction to the illuminating device;
   the receiver, configured to receive the target beam angle instruction from the input apparatus;
   the controller, configured to receive the target beam angle instruction received by the receiver and determine power of each light source by calculating or looking up a parameter table; and
   the driver, configured to drive the corresponding light source to emit light according to the power of each light source to obtain a target beam angle;
   wherein the illuminating device comprises a first light source and a second light source, each of the first light source and the second light source comprises a group of light-emitting diode (LED) luminous elements, the two groups of LED luminous elements each are evenly distributed on an annular surface, the two annular surfaces are concentric, and the optical elements are annular lenses coupled to the annular surfaces; or, the two groups of LED luminous elements are arranged on one annular surface, the LED luminous elements of the first light source and the second light source are alternately arranged, and each of the first light source and the second light source is provided with a plurality of the optical elements respectively coupled to positions where the LED luminous elements thereof are located.

13. The system according to claim 12, wherein spatial luminous intensity distribution data of the first light source and the second light source is obtained by a spatial distribution photometer and configured to determine the parameter table and calculate first control power and second control power.

* * * * *